Dec. 1, 1959 E. TIGER 2,915,265

MOTOR MOUNTING FOR MAGNETIC RECORDING DEVICES

Filed Jan. 30, 1957 2 Sheets-Sheet 1

Inventor
Emil Tiger
By Silverman + Mullin
attorneys

Dec. 1, 1959 E. TIGER 2,915,265

MOTOR MOUNTING FOR MAGNETIC RECORDING DEVICES

Filed Jan. 30, 1957 2 Sheets-Sheet 2

Inventor
Emil Tiger
By Silverman & Mullin
Attorneys

United States Patent Office 2,915,265
Patented Dec. 1, 1959

2,915,265

MOTOR MOUNTING FOR MAGNETIC RECORDING DEVICES

Emil Tiger, Skokie, Ill., assignor to Sound, Inc., Chicago, Ill., a corporation of Illinois Application January 30, 1957, Serial No. 637,253

5 Claims. (Cl. 248—18)

This invention relates generally to a motor mounting for magnetic reproducing and/or recording devices and more particularly, is concerned with a mounting which enables a fractional horsepower motor to be adjusted in a plurality of directions.

The particular motor mounting with which this specification is concerned is especially adapted for use in so-called wire or tape recording devices of the type, for example, illustrated and described in U.S. Patent 2,768,244 issued to Emil Tiger, October 23, 1956, and as well in the magnetic reproducing device shown and described in a co-pending application of the applicant herein, Serial No. 569,817, filed March 6, 1956, and entitled Tape Transporting Device for Use With Cartridges. In the patented structure the apparatus includes means for transporting the tape past electromagnetic heads which can perform the functions of recording, reproducing and erasing. The apparatus described in said patent, in addition to the tape transporting mechanism, includes an electronic amplifier, a source of direct current with its accompanying rectifier system, and an electronic oscillator for producing bias signals for use in connection with recording upon the tape. The latter mechanism, that is the apparatus shown and described in the co-pending application, may be limited only to tape transporting apparatus, but does include one or more electromagnetic heads for reproducing and/or recording and erasing.

In either case the purpose of the motor is to drive the magnetic member in a forward direction, or in the case of the patented structure and similar devices presently known, in a reverse direction as well. In either case the tape must be driven at several speeds in the usual device, and the motor is usually of the shaded pole variety. Such motors may have one or more pairs of poles with accompanying coils for producing the necessary rotation of their respective armatures.

In apparatus which uses motors of this kind the recording member, usually in the form of a narrow strip of plastic tape coated with comminuted particles of magnetizable material, is moved past the electromagnetic heads. The field which is produced by the heads during recording will magnetize the tape, and during reproduction, the movement of the tape with its now magnetized particles past the heads induces currents in the electrical circuit of the head by virtue of passage through the magnetic field thereof.

There are several sources of hum in the usual apparatus of this kind. Since the apparatus in most cases is basically energized by 60-cycle alternating current, an audible 60-cycle note appears on the recording medium and may become considerably annoying during reproduction. Among the sources of such noises are stray flux or the spreading flux from the poles of the motor itself, hum derived from the audio amplifier if there is an audio amplifier associated with the device, stray flux from the power transformer used in connection with the rectifier, and an important source is stray or fringing flux from the electromagnetic heads themselves.

A considerable amount of hum can be eliminated or decreased in intensity by suitable shielding, proper placement of components, and by good engineering.

In the production of magnetic reproducing and recording devices for general use, it is not economical to spend a great deal of time and effort in the engineering of a device which will have a very low hum, and as well, it is expensive to work upon each individual model in order to decrease the hum therein.

A principal object of this invention is to provide a motor mounting by means of which it is possible to adjust the orientation of the motor to alleviate a considerable amount of the hum.

Additionally, objects of the invention include provision for adjustably mounting the motor in a device of this kind so that the coupling between the motor and the driven parts of the apparatus may be suitably adjusted in several different manners.

Another object of the invention is to provide a motor mounting in which the motor is easily installed or removed from the apparatus; in which the motor is mounted in such a manner as to produce little or no vibration; and to provide a motor mounting which is economical to manufacture and made up of a small number of simple parts.

Many other objects of the invention will appear from the detailed description of the preferred embodiment, and it will become apparent that there are advantages not specifically enumerated above.

In connection with the detailed description there are drawings which illustrate the preferred embodiment in accordance with the patent laws.

Figure 1:
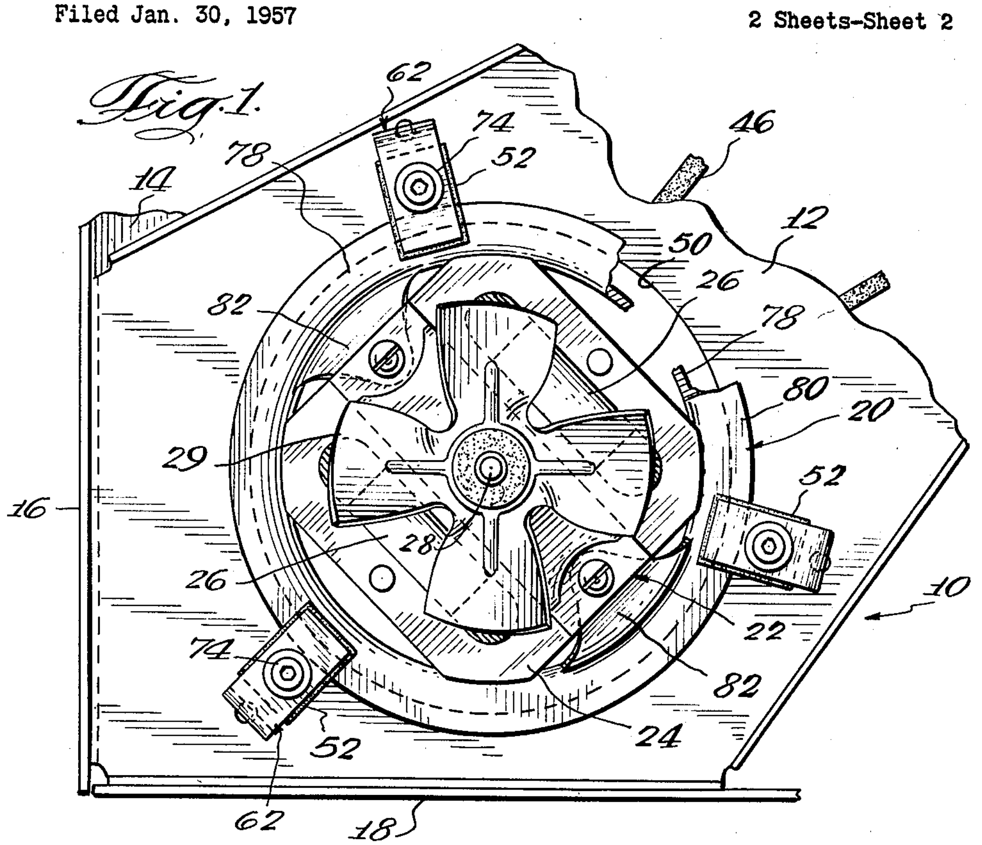
Fig. 1 is a bottom plan view of a motor mounting in accordance with the teachings of the invention.
Figure 2:
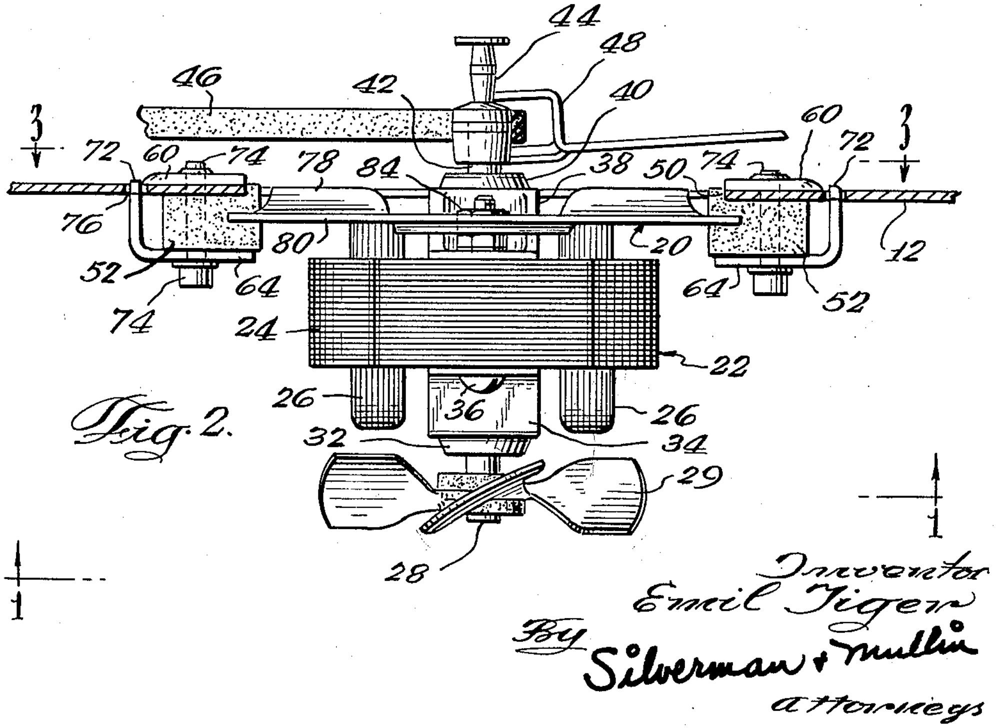
Fig. 2 is a sectional view through the mounting.

Considering now Figs. 1 and 2, there is illustrated a portion of the chassis of a recording and reproducing device which is designated generally by the reference character 10. The particular portion illustrated may consist of a special subchassis or motor mounting plate 12 spaced below a principal mounting plate 14 by any suitable means such as, for example, flanges 16 and 18 interconnecting the two plates 12 and 14. In any event, any suitable base may be used upon which to secure the motor and its mounting; the mounting may be designated generally by the reference character 20.

The motor which is illustrated is designated generally 22, and in its normal position, which is best shown in Fig. 2, the axis of the motor is vertical. There is a shell type of core 24 made up of suitable steel laminations clamped together, and there are field coils 26 arranged to cooperate with the armature of the motor which is not readily seen in the drawings. The motor shaft protrudes from the top and bottom of the motor, the bottom end being designated 28 and having a multiple blade fan 29 secured thereto for cooling the motor. The bottom end of the shaft is mounted in a suitable journal 32 carried by means of a U-shaped bracket 34 secured to the motor 22 by means of bolts 36 which pass through suitable openings formed in the laminations.

The type of motor readily purchased upon the open market usually has two of the brackets described, and the top and bottom are held together by the bolts such as 36 which also serve to clamp the laminations together. In the invention herein the bolt is used for an additional purpose which will be described. In the meantime attention may be invited to the upper U-shaped bracket shown at 38 which carries the journal 40 for the upper end of the motor shaft 42. As shown in Fig. 2, there is a two-speed capstan 44 which is mounted on the shaft end 42, the rotation of which will drive the pulley belt 46. At 48 can be seen a portion of the speed change lever, the operation of which is of no importance to this invention.

Figure 3:
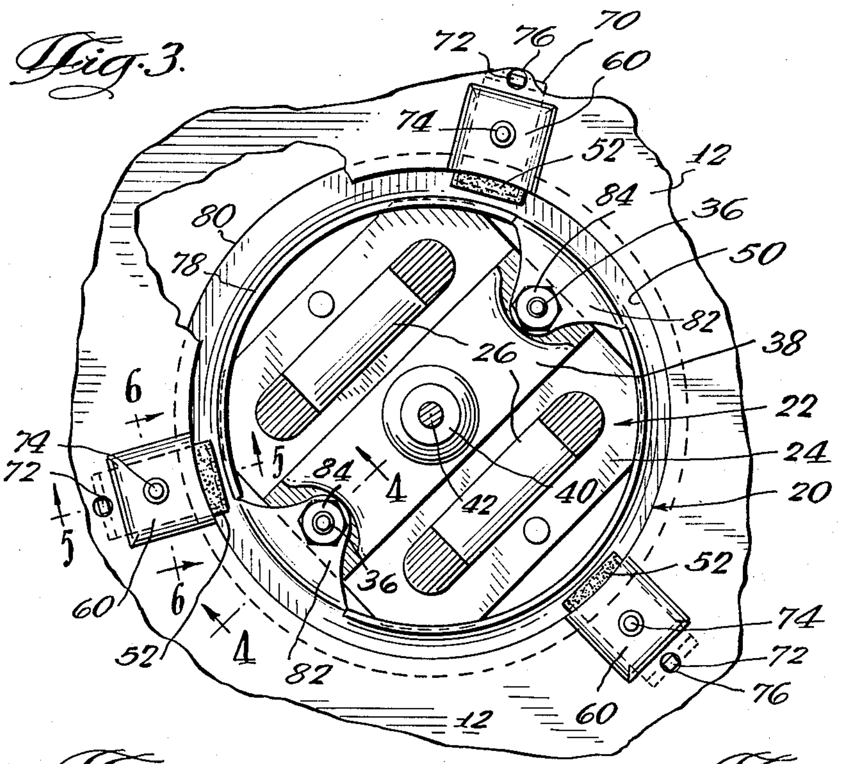
Fig. 3 is a top plan view taken generally along the line 3—3 of Fig. 2 and looking down upon the motor mounting.
Figures 4, 5, 6, 7, 8:
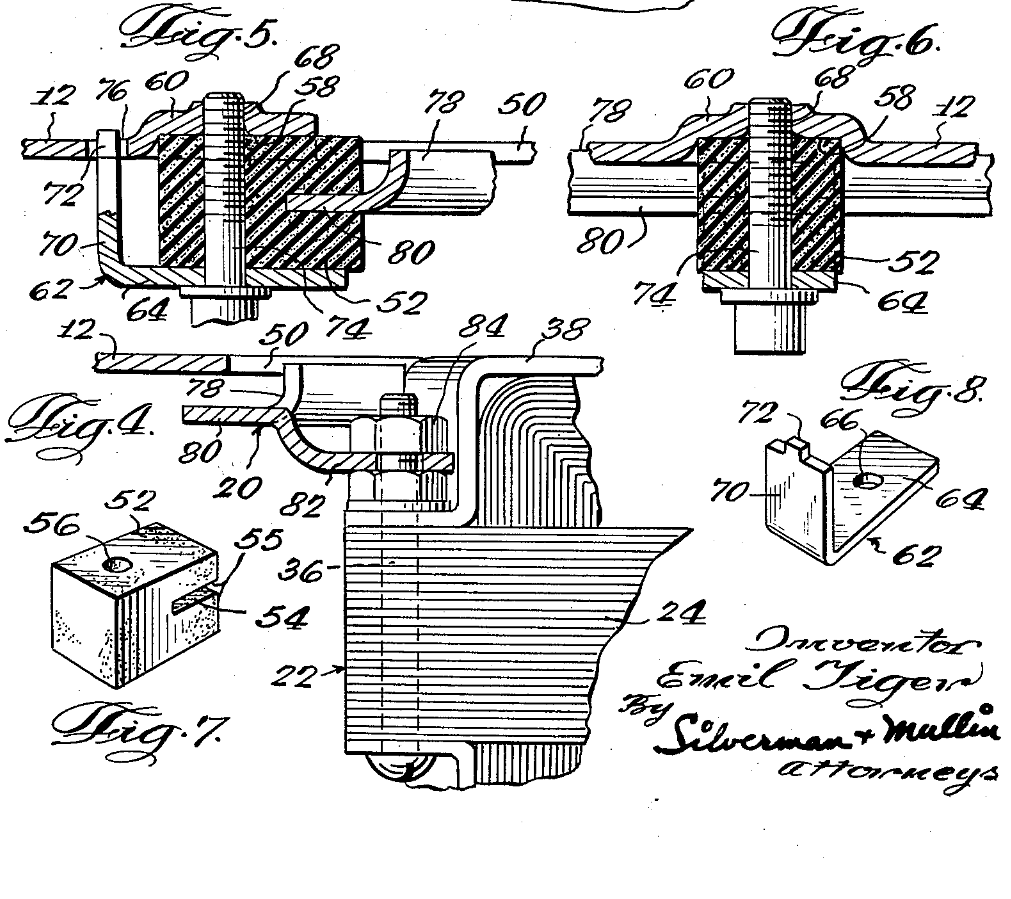
Fig. 4 is a sectional view on an enlarged scale through the mounting along the line 4—4 of Fig. 3 and in the direction indicated.
Fig. 5 is a sectional view through one of the rubber mounting blocks along the line 5—5 of Fig. 3 and in the direction indicated.
Fig. 6 is a sectional view at right angle to the view of Fig. 5.
Fig. 7 is a perspective view of one of the rubber mounting blocks disassociated from the mounting.
Fig. 8 is a perspective view of one of the clamping brackets used to secure the mounting at the ring.

There is provided a circular opening 50 in the motor support plate 12 co-axial with the motor axis, and the said circular opening 50 has three rubber blocks 52 mounted 120 degrees apart adjacent the edge of the same about the said opening. The said blocks are all identical and hence, there is only need to describe one. Each block is as shown in Fig. 7 of generally rectangular horizontal cross-section and square vertical cross-section. A short horizontal slot 54 is formed in the block, providing upper and lower jaws 55 and a vertical hole 56 is provided therein. As shown best in Fig. 5, there is an upset rectangular depression 58 formed at each mounting position in the motor mounting plate 12 which seats the respective blocks 52. The seats 58, as they will hereinafter be called, are on the bottom surface of the plate 12, and hence, on the top of the plate there will be a protruding rectangular plaque 60 at each of the positions of a mounting seat 58.

Each of the blocks 52 is clamped in its seat 58 by means of an L-shaped clamping bracket 62 which is illustrated apart from the assembly in Fig. 8. The longer arm 64 is adapted to be disposed parallel with the plate 12 and with an opening 66 therein aligned with a threaded opening 68 provided in the plaque 60. The shorter arm 70 is normal to the plate 12 and has a locating lug 72 formed at its extremity. As best shown in Figs. 5 and 6 the block 52 is clamped between the arm 64 and the plaque 60 engaged in the seat 58 with the slot 54 opening radially inward toward the center of the circular opening 50. The opening 56 is aligned with openings 66 and 68 and a machine screw 74 is passed therethrough and threadedly engaged in the opening 68. The locating lug is engaged in a hole 76 provided radially outward of the plaque 60.

The motor 22 is secured to an annular motor mounting ring 78 which is of generally J-shaped cross-section as perhaps best shown in Fig. 5, the ring being mounted coaxial with the motor and adapted to be disposed coaxial with the circular opening 50. The ring has a radially outwardly extending circumferential flange 80 the diameter of which is greater than the diameter of the opening 50 and said flange 80 is engaged in the slots 54 of the respective rubber blocks 52 and thereby sandwiched between the two parts or jaws 55 thereof. The ring 78 has a pair of radially inwardly extending integral tabs or lugs 82 which are provided with perforations aligned with the bolts 36 whereby the bolts may secure the ring 78 to the motor through the medium of nuts 84.

By loosening the screws 74 the entire assemblage of motor 22 with its supporting ring may be rotated through a substantial portion of a circle in order to use the flux of the motor fields to balance or offset the fields of other sources of hum in the apparatus. Once the desired position has been achieved, the screws are tightened clamping the motor in place. The rubber blocks 52 absorb vibration and noise which might be transmitted from the motor to the apparatus and possibly to the magnetic tape or wire. The location of the motor 22 relative the plate 12 is capable of limited adjustment as well, since there is sufficient space between the ring and the opening 50 to permit of this adjustment. The tension in the belt 46 is thereby readily adjusted. By varying the amount of compression of the rubber blocks, a limited amount of adjustment of the vertical axis of the motor relative the plane of the plate 12 is capable of being achieved.

In addition to the above, it will be obvious that the removal of the motor from the device 10 is easily accomplished, since the motor need not be disassembled from the ring 78. Loosening the screws 74 is usually sufficient to enable the ring to be slipped out of the slots 54 enabling the assemblage to be dropped. Replacement is thus simple, not usually requiring the unfastening of any parts or the disassembly of any screws or the like.

The invention is also applicable to an arrangement in which the motor carries the blocks and clamps while the plate carries an annular ring with the flange thereof engaged by the rubber blocks.

It is believed that the advantages of the invention and the features thereof are capable of being understood without further explanation, and it is desired to point out that the details of structure and size and proportion of parts are subject to considerable variation without departing from the spirit or scope of the invention as defined in the appended claims. There may be more or less of the rubber block mountings, for example, and the blocks themselves can each be made up of more than a single part and be formed of many resilient materials other than rubber—such as synthetic rubber-like compositions, resilient plastics, and the like.

What it is desired to secure by Letters Patent is:

1. A motor mounting for adjustably mounting a small electric motor upon a flat plate in a recording and/or reproducing device having stray electromagnetic fields, which comprises, an annular ring adapted to be secured to said motor co-axial therewith and having a radially outwardly extending annular flange, an opening in said plate and the motor adapted to be suspended in said opening coaxially therewith, a plurality of blocks of rubber-like material circumferentially arranged about said opening and each having means for adjustably compressing the same, each block having a slot facing radially inward, and the flange being engaged in said slots whereby said motor and ring may be rotated axially for using the field of said motor to balance said stray fields.

2. A motor mounting for mounting an electric motor upon a relatively flat plate comprising, an annular ring having radially inwardly extending support members integral with the ring for attachment of the motor coaxial with the ring and an annular flange, a plurality of clamp means engaging the ring at circumferentially spaced portions thereabout, said clamp means each including a block of resilient material having a transversely extending slot in a lateral surface thereof positioned to slidably receive the flange therein and a clamp bracket secured to the plate with the block sandwiched between the plate and the bracket and an axially adjustable fastening member engaged through the plate, block and bracket permitting said bracket to be selectively positioned relative the plate to vary the compression of the block and hence vary the extent of gripping of said flange thereby.

3. A motor mounting as described in claim 2 in which said plate has a depressed seat for seating each block therein and each bracket comprises a substantially L-shaped member having one leg thereof substantially parallel with the plate engaged against a block and the second leg thereof transverse to the plate and removably connected therewith.

4. A motor mounting for mounting an electric motor upon a relatively flat plate comprising, an annular ring having radially inwardly extending support members integral with the ring for attachment of the motor coaxial with the ring and an annular flange, a plurality of clamp means engaging the ring at circumferentially spaced portions thereabout, said clamp means each including a block of resilient material having a transversely extending slot in a lateral surface thereof positioned to slidably receive the flange therein and a clamp bracket secured to the plate with the block sandwiched between the plate and the bracket and an axially adjustable fastening member engaged through the plate, block and bracket permitting said bracket to be selectively positioned relative the plate to vary the compression of the block and hence vary the extent of gripping of said flange thereby, said clamp means also being releasable to permit limited axial rotation of the ring relative the plate.

5. A motor mounting for adjustably mounting a small electric motor upon a flat plate in a recording and/or reproducing device having stray electromagnetic fields, which comprises, an annular ring adapted to be secured to said motor co-axial therewith and having a radially outwardly extending annular flange, an opening in said plate and the motor adapted to be suspended in said opening coaxially therewith, a plurality of blocks of rubber-like material circumferentially arranged about said opening and each having means for adjustably compressing the same, each block having a slot facing radially inward, and the flange being engaged in said slots whereby said motor and ring may be rotated axially for using the field of said motor to balance said stray fields, said adjustable compression means including a bracket member removably attached at one end thereof to said plate and having a ledge part spaced from the plate with said block sandwiched between the ledge and the plate, and an axially movable member engaged through the ledge and block with the plate for varying distance between said ledge and plate.

References Cited in the file of this patent

UNITED STATES PATENTS

| | | |
|---|---|---|
| 2,020,092 | Allen | Nov. 5, 1935 |
| 2,171,441 | Barry | Aug. 29, 1939 |
| 2,188,807 | Castricone | Jan. 30, 1940 |
| 2,451,970 | Odor | Oct. 19, 1948 |

FOREIGN PATENTS

| | | |
|---|---|---|
| 837,584 | France | Feb. 14, 1937 |